Figure 1:
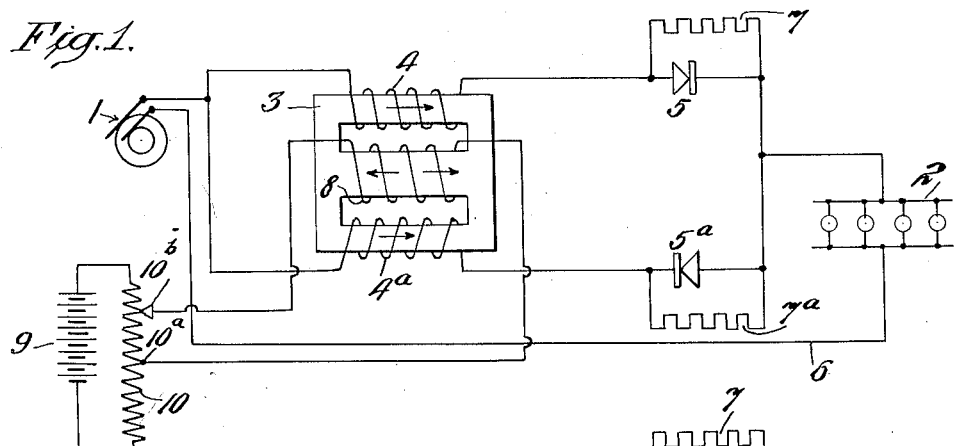

Aug. 16, 1938.   F. G. LOGAN   2,126,790
ELECTRIC CONTROLLING APPARATUS
Filed June 23, 1936

INVENTOR
Frank G. Logan
BY
Lawrence K. Sager
his ATTORNEY

Patented Aug. 16, 1938

2,126,790

UNITED STATES PATENT OFFICE 2,126,790

ELECTRIC CONTROLLING APPARATUS

Frank G. Logan, Mount Vernon, N. Y., assignor to Ward Leonard Electric Company, a corporation of New York Application June 23, 1936, Serial No. 86,743

12 Claims. (Cl. 171—242)

This invention relates to the control of the voltage applied to a consumption circuit and to the control of the current therein and particularly relates to an improved method and means for controlling such voltage and current over a wide range. It is especially desirable for the control of lamp circuits for change of lighting effects and for securing a graduated control of lighting effects such as required in the different scenes of stage productions.

In the usual type of dimmer reactor for control of lamp circuits, the core is wound with one or more windings through which an alternating current passes to the consumption circuit and creates an alternating flux in the core of the reactor. The control is obtained by passing a variable direct current through a winding on the core which tends to saturate the core according to the amount of direct current passing through the saturating winding. Where the control is dependent only upon such a saturating winding, the range of control of voltage and current of the consumption circuit is limited in practice and the ampere turns of the saturating direct current winding must be quite high in order to secure full brilliancy of the lamps.

In the present invention a reactor is utilized but instead of being subjected to an alternating flux by the load current winding or windings, the current through such a winding is an intermittent direct current which tends to magnetize the reactor core always in the same direction, as regards the effect of any one such winding. Although electric valves, such as rectifiers, are used for controlling the current delivered to the consumption circuit from the alternating current source, yet the current in the consumption circuit is an alternating current, the relationship of the parts being such that the windings on the reactor which conduct the load current tend to magnetize the core always in the same direction, as regards the effect of any one such winding. In one form of this invention a variable direct current winding is utilized on the core for controlling the voltage and current of the consumption circuit and instead of supplying this current in only one direction, it is, in the preferred embodiment, controlled in both directions so as to impose a flux on the core additive to the flux due to the load current winding and also to create a flux which is opposed to the flux of the load current winding. In another form of the invention the flux due to two or more load windings is caused to pass alternately in one direction and then in the opposite direction through a portion of the reactor core which is subject to control by change of impedance in the circuit of a coil enveloping that portion of the core. The invention is applicable to various purposes and may be utilized in many cases where special results are desired by the addition of features known in the art for securing special results.

One object of the invention is to obtain wide range of control of the voltage and current of the consumption circuit. Another object is to accomplish this result by simple forms of apparatus which may be manufactured economically as regards cost of material and labor. Another object is to provide improved apparatus which will be durable and dependable in operation under long continued use. Another object is to provide apparatus which will be economical in operation. Another object is to provide apparatus which will have a comparatively large capacity and occupy less space than prior forms of dimmer control apparatus. Other objects and advantages will be understood from the following description and accompanying drawing which illustrate preferred embodiments of the invention.

Figure 2:
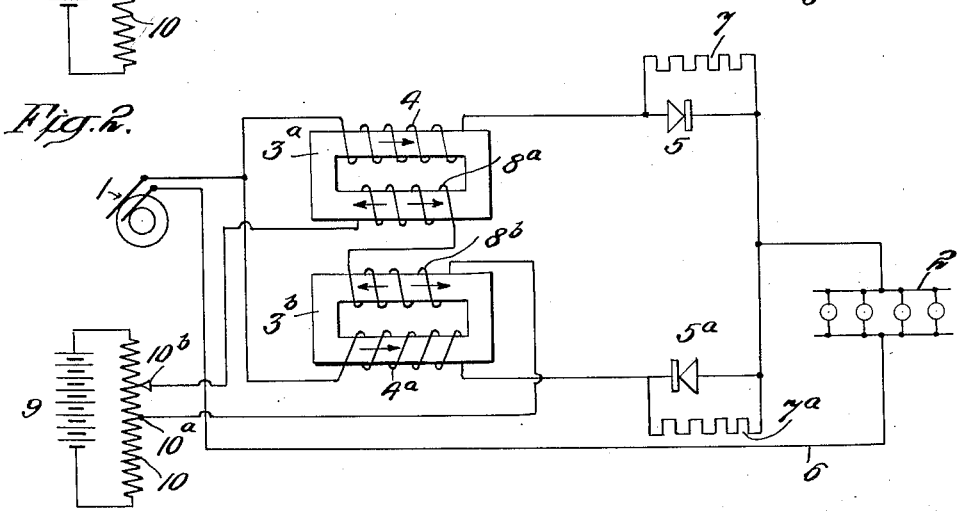
Figure 3:
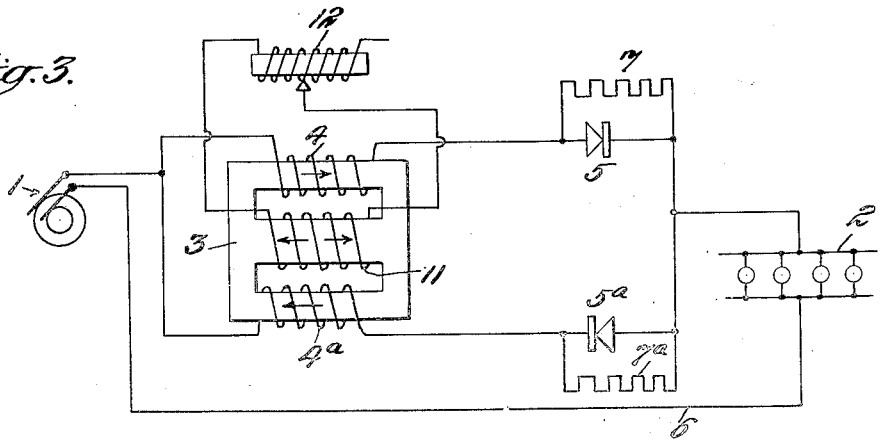

Fig. 1 is a diagram showing a preferred embodiment of the invention; Fig. 2 is a diagram similar to Fig. 1 except separate reactor cores are used instead of a common reactor core of Fig. 1; and Fig. 3 is a diagram showing another embodiment of the invention.

Referring to Fig. 1, an alternating current single phase source 1 is indicated which supplies current to the consumption circuit 2, indicated as having a lamp load but which may be of any character desired. A laminated reactor core 3 is shown of the three-legged type, the outside legs having windings 4 and 4a, one terminal of each of these windings being connected to one side of the source 1. The remaining terminal of winding 4 is connected to one terminal of an electric valve or rectifier 5, the other terminal of which is connected to one side of the consumption circuit. The remaining terminal of winding 4a is connected to a terminal of an electric valve or rectifier 5a, the other terminal of which is likewise connected to the same side of the consumption circuit as the rectifier 5. The other side of the consumption circuit is connected by the wire 6 to the remaining terminal of the alternating current source 1. The rectifiers 5 and 5a are connected in a reverse direction with reference to each other in the connection to one side of the consumption circuit as indicated in Fig. 1. This relationship results in the consumption circuit being supplied with an alternating current even though the current is received from the source through electric valves or rectifiers. This will be understood by assuming, for example, that the potential of the source supplying current to the windings 4 and 4a is positive. Assuming that the rectifier 5 conducts current in one direction when one terminal of the source is positive as assumed, then current will pass from the source through winding 4 and through the rectifier 5 to the consumption circuit and then back through the connection 6 to the other terminal of the source. Under these conditions no current will pass through the rectifier 5a owing to its being connected in a reverse manner to that of the rectifier 5. When the voltage of the source 1 is reversed and the upper terminal thereof becomes negative and the lower terminal positive, then current will pass to the consumption circuit from the lower terminal of the source through the connection 6 and through the consumption circuit in a reverse direction and then through the rectifier 5a and winding 4a to the upper terminal of the source. During this condition no current passes through the rectifier 5 because the upper terminal of the source 1 has assumed a negative potential with reference to the other terminal of the source. Thus as the electromotive force of the source alternates, current passes through reactor winding 4 and through the rectifier 5 to the consumption circuit in one direction and back to the source and then passes from the source through the consumption circuit in the opposite direction and then through rectifier 5a and reactor winding 4a back to the source. An impedance device 7, which may be a non-inductive resistance, may in some cases be connected in shunt around the terminals of the rectifier 5 and similarly an impedance device 7a may be connected in shunt across the terminals of the rectifier 5a.

The control of the current and voltage is attained by a winding 8 shown wound on the middle leg of the reactor core and its terminals are connected to any suitable source of direct current which is indicated as a battery 9. A potentiometer 10 is connected across the terminals of the direct current source 9, one terminal of the control winding 8 being connected to a mid-point 10a of the potentiometer and the other terminal being connected to a movable contact 10b of the potentiometer which contact is adapted to be moved to any point desired and on either side of the connection 10a. It is evident that movement of the contact 10b will cause a current of any desired value within range to pass through the winding 8 and that this current may be in one direction or the other according to which side of the connection 10a the contact 10b is located.

The coils 4 and 4a are wound in such direction on their respective legs of the core that they tend to create a flux in a common direction through the middle leg of the core. Thus the arrows on the outside legs of the core indicate an assumed direction of flux from left to right which would result in the flux due to these windings passing from right to left in the middle leg of the core. If it be assumed that the movable contact 10b of the potentiometer coincides with the mid-tap 10a, no direct current will be passed from the source 9 through the winding 8 and the flux created in the reactor core will be that due only to the windings 4 and 4a. Under these conditions with the flux due to these windings being always in the same direction, the voltage imposed upon the consumption circuit will be less than the maximum voltage and will be much above the minimum voltage and may be such as to give the lamps about half their brilliancy. When the control contact 10b is moved from the point 10a in a direction to cause the current in control winding 8 to create a flux acting cumulatively with that of the flux due to the windings 4 and 4a, as indicated by the left-hand arrow on the middle leg of the core, then the total magnetization of the core is correspondingly increased and the voltage applied to the consumption circuit is increased. Full voltage and full brilliancy of the lamps is attained when the current in the winding 8 is sufficient to saturate the reactor core so that the drop in the windings 4 and 4a is reduced to a minimum. The ampere turns of winding 8 for giving full voltage to the consumption circuit is very much less in this improved form of control compared with the usual type because the winding 8 is obliged to add only sufficient magnetizing current to bring the core to saturation, or to the knee of the magnetization curve, beyond the magnetization already caused by the load windings 4 and 4a. On the other hand in the usual dimmer reactor, the direct current saturated winding must supply sufficient current by itself to bring the magnetization of the iron core to or near the point of saturation.

When it is desired to reduce the voltage of the consumption circuit from the full voltage condition, the control contact is moved toward the mid-point 10a which gradually reduces the total flux of the reactor core and gradually decreases the load circuit voltage. When the control contact passes to the other side of the point 10a, the current in the control winding 8 is reversed and tends to create a flux which opposes the flux due to the windings 4 and 4a, as indicated by the right-hand arrow on the middle leg of the core. The action which now takes place is one which not only tends to reduce the total average flux of the core by opposition of the flux due to the control winding to the flux due to the load windings but an additional result occurs because when each of the load windings is inactive in delivering current to the load circuit, the flux due to the control winding passes through the inactive coils alternately and conditions or biases the iron in the opposite direction to that in which it will be magnetized when current again passes through each of the load windings. This biasing of the iron in a direction opposite to that due to the current in the load windings tends to greatly increase the counter-electromotive force developed in the load windings during the alternate passage through these windings of the load current and thereby reduces the voltage available for application to the consumption circuit. The current in the control winding is particularly effective when passing in this reverse direction because the core of the reactor is then being worked upon the steep portion of the magnetization curve giving comparatively large change of voltage applied to the consumption circuit with comparatively small changes of current in the control winding. When the reverse current in the control winding is increased, the portions of the core within the load windings are more and more biased in the reverse direction resulting in the voltage of the consumption circuit being more and more reduced. This reverse current can readily cause the voltage applied to the consumption circuit to be reduced to or closely approach zero, whereas in the usual type of dimmer reactor the range of control in the direction of reduced consumption circuit voltage is limited to considerably above the zero limit.

The rectifiers 5 and 5a may be of any type and for the purpose of economy they may be of the copper oxide type as indicated in Fig. 1. It is desirable to use low voltage rectifiers and with the copper oxide type it is preferable to use only one disk unit in series in the circuit and increase the current capacity by providing several of them in parallel. The shunting impedances 7 and 7a around the rectifiers serve the double purpose when used, of protecting the rectifiers from the effects of high reverse voltage and also serve to pass a small reverse exciting current through the load windings 4 and 4a during the alternate periods when they are inactive in supplying current to the load circuit and thereby assist in the control of the voltage applied to the load circuit. This reverse current biases the iron in a direction opposite to that which is tended to be created by the passage of the load current through these windings and therefore cooperates with the reverse control current to assist it in reducing the voltage applied to the consumption circuit. The lower the impedance of the resistors 7 and 7a, the less will be the value of the reverse current in the control winding 8 required to attain a given minimum load voltage. In some cases the use of a reverse current in the control winding may be omitted, as when the impedances 7 and 7a are used. In some instances these impedances may be omitted but in that event the reverse current in the control winding would ordinarily be required for wide range of control toward minimum voltage. When the current through the control winding is in the cumulatively acting direction for increasing the voltage applied to the consumption circuit, the reverse control current due to the impedances 7 and 7a is not of sufficient comparative amount to materially reduce the desired increase in voltage of the consumption circuit. As copper oxide rectifiers have a comparatively high reverse current, they may in some cases serve to supply the desired reverse exciting current intermittently instead of providing the impedances 7 and 7a.

In Fig. 2 the parts corresponding to those of Fig. 1 are similarly numbered but in this instance the core is divided to form two cores 3a and 3b. The flux due to the load coils 4 and 4a is always in the same direction and is indicated by arrows as passing from left to right. The control windings 8a and 8b on the cores are shown connected in series with each other and to the potentiometer, although they may be connected in parallel if desired. The current in these control windings when passing in one direction will cause their fluxes to act cumulatively with the flux due to the load windings, as indicated by the left-hand arrows on the cores of the control windings, giving an increase in voltage applied to the consumption circuit, the greater the value of the cumulatively acting control current. When the control current is decreased and then reversed, the voltage applied to the consumption circuit is gradually decreased to the desired minimum in the manner already explained. The reactor cores may evidently be made of any desired form or shape and utilized singly or combined to form a common core, provided the proper functional relationship of the windings and control of the fluxes are maintained.

In Fig. 3 the parts already described are indicated by the same reference characters but in this case the control is accomplished by an induced current of variable amount. In this embodiment of the invention the flux due to the load windings 4 and 4a is caused to pass alternately first in one direction and then in the other through a portion of the reactor core 3. This is indicated by the direction of the arrows on the legs within these windings, the upper arrow indicating an assumed direction of flux from left to right resulting in this flux passing through the central leg of the core from right to left as indicated by the left-hand arrow on the middle leg of the core. The relative direction of flux of the winding 4a is indicated by the arrow on the lower leg of the core wherein the flux will pass from right to left and then from left to right through the middle leg of the core as indicated by the right-hand arrow on this leg. Thus as the load current is passed through the windings 4 and 4a alternately, the middle leg of the core will be subjected to continuously changing flux passing first in one direction and then in the reverse direction. The portion of the core which is subjected to this alternating flux is enveloped by a control winding 11, the terminals of which are connected to an adjustable inductor 12.

If it be assumed that the adjustable means of the impedance device 12 be moved to insert maximum impedance in the circuit of the control winding 11, then the current induced in the circuit of this winding would be comparatively slight and have little or no appreciable affect upon the magnetization of the reactor core. Under such conditions the reactance of the windings 4 and 4a has its full effect resulting in a high counter-electromotive force therein which correspondingly reduces the voltage applied to the consumption circuit. When the impedance of the device 12 is gradually reduced, it permits an increasingly large current to be induced in the circuit of the control winding 11 which tends to increase the total magnetization of the reactor core and thereby correspondingly reduce the reactance of the load windings 4 and 4a, resulting in an increased voltage to be applied to the consumption circuit. When the impedance of the control circuit is reduced to a minimum, the reactance of the load windings is comparatively small and a maximum voltage is applied to the load circuit. The resistors 7 and 7a when used, act in the manner already described. If desired, the resistors 7 and 7a could be made adjustable and controlled by the same means as the movable element of the impedance 12 and be given a comparatively small value with the maximum impedance of the control circuit of winding 11 and be given a comparatively high value with the minimum impedance of the control circuit.

Although preferred embodiments of this invention have been described, it will be understood that various modifications and applications thereof may be made. In some cases the method of control described with reference to Fig. 3 may be combined with that shown in Fig. 1. Also, although the invention has been described as applied to the use of a single-phase system, the invention may be applied to a polyphase system in a manner which will be understood by those skilled in the art.

I claim:

1. The combination of an alternating current source, an electric valve for passing current from said source in one direction through a consumption circuit, a second electric valve for passing current from said source in the reverse direction through the consumption circuit, and reactive means having windings connected in series with said valves respectively.

2. The combination of an alternating current source, an electric valve for passing current from said source in one direction through a consumption circuit, a second electric valve for passing current from said source in the reverse direction through the consumption circuit, reactive means having windings connected in series with said valves respectively, and auxiliary means for controlling the flux of said reactive means.

3. The combination of an alternating current source, an electric valve for passing current from said source in one direction through a consumption circuit, a second electric valve for passing current from said source in the reverse direction through the consumption circuit, reactive means having windings connected in series with said valves respectively, and auxiliary means for acting cumulatively with said windings to increase the flux of said reactive means.

4. The combination of an alternating current source, an electric valve for passing current from said source in one direction through a consumption circuit, a second electric valve for passing current from said source in the reverse direction through the consumption circuit, reactive means having windings connected in series with said valves respectively, and auxiliary means for acting in opposition to said windings to decrease the flux of said reactive means.

5. The combination of an alternating current source, an electric valve for passing current from said source in one direction through a consumption circuit, a second electric valve for passing current from said source in the reverse direction through the consumption circuit, reactive means having windings connected in series with said valves respectively, auxiliary means for controlling the flux of said reactive means, and impedance devices connected in shunt to said valves respectively.

6. The combination of an alternating current source, an electric valve for passing current from said source in one direction through a consumption circuit, a second electric valve for passing current from said source in the reverse direction through the consumption circuit, reactive means having a core and having windings connected in series with said valves respectively and causing flux to be directed through the core of said means in one direction, an auxiliary winding on said core subjected to said flux in one direction, and means for supplying a variable direct current to said auxiliary winding.

7. The combination of an alternating current source, an electric valve for passing current from said source in one direction through a consumption circuit, a second electric valve for passing current from said source in the reverse direction through the consumption circuit, reactive means having a core and having windings connected in series with said valves respectively and causing flux to be directed through the core of said means in one direction, an auxiliary winding on said core subjected to said flux in one direction, means for supplying a variable direct current to said auxiliary winding, and impedance devices connected in shunt to said valves respectively.

8. The combination of an alternating current source, an electric valve for passing current from said source in one direction through a consumption circuit, a second electric valve for passing current from said source in the reverse direction through the consumption circuit, reactive means having a core and having windings connected in series with said valves respectively and causing flux to be directed through the core of said means in one direction, an auxiliary winding on said core subjected to said flux in one direction, and means for supplying a variable and reversible direct current to said auxiliary winding.

9. The combination of an alternating current source, an electric valve for passing current from said source in one direction through a consumption circuit, a second electric valve for passing current from said source in the reverse direction through the consumption circuit, reactive means having a core and having windings connected in series with said valves respectively and causing a variable flux to be directed through the core of said means, an auxiliary winding on said core subjected to said variable flux, and means in the circuit of said auxiliary winding for adjusting the value of the current induced in the circuit of said auxiliary winding.

10. The combination of an alternating current source, an electric valve for passing current from said source in one direction through a consumption circuit, a second electric valve for passing current from said source in the reverse direction through the consumption circuit, reactive means having a core and having windings connected in series with said valves respectively and causing a variable flux to be directed through the core of said means, an auxiliary winding on said core subjected to said variable flux, means in the circuit of said auxiliary winding for adjusting the value of the current induced in the circuit of said auxiliary winding, and impedance devices connected in shunt to said valves respectively.

11. The combination of an alternating current source, an electric valve for passing current from said source in one direction through a consumption circuit, a second electric valve for passing current from said source in the reverse direction through the consumption circuit, reactive means having a core and having windings connected in series with said valves respectively and causing a variable and reversible flux to be directed through the core of said means, an auxiliary winding on said core subjected to said variable and reversible flux, and means in the circuit of said auxiliary winding for adjusting the value of the current induced in the circuit of said auxiliary winding.

12. The combination of an alternating current source, an electric valve for passing current from said source in one direction through a consumption circuit, a second electric valve for passing current from said source in the reverse direction through the consumption circuit, reactive means having a core and having windings connected in series with said valves respectively and causing a variable and reversible flux to be directed through the core of said means, an auxiliary winding on said core subjected to said variable and reversible flux, means in the circuit of said auxiliary winding for adjusting the value of the current induced in the circuit of said auxiliary winding, and impedance devices connected in shunt to said valves respectively.

FRANK G. LOGAN.